April 5, 1955  H. S. CAMPBELL  2,705,461
CARGO NET FABRICATED FROM FLEXIBLE CABLE
Filed June 19, 1951  3 Sheets-Sheet 1

INVENTOR
Harris S. Campbell

April 5, 1955 H. S. CAMPBELL 2,705,461
CARGO NET FABRICATED FROM FLEXIBLE CABLE
Filed June 19, 1951 3 Sheets-Sheet 2
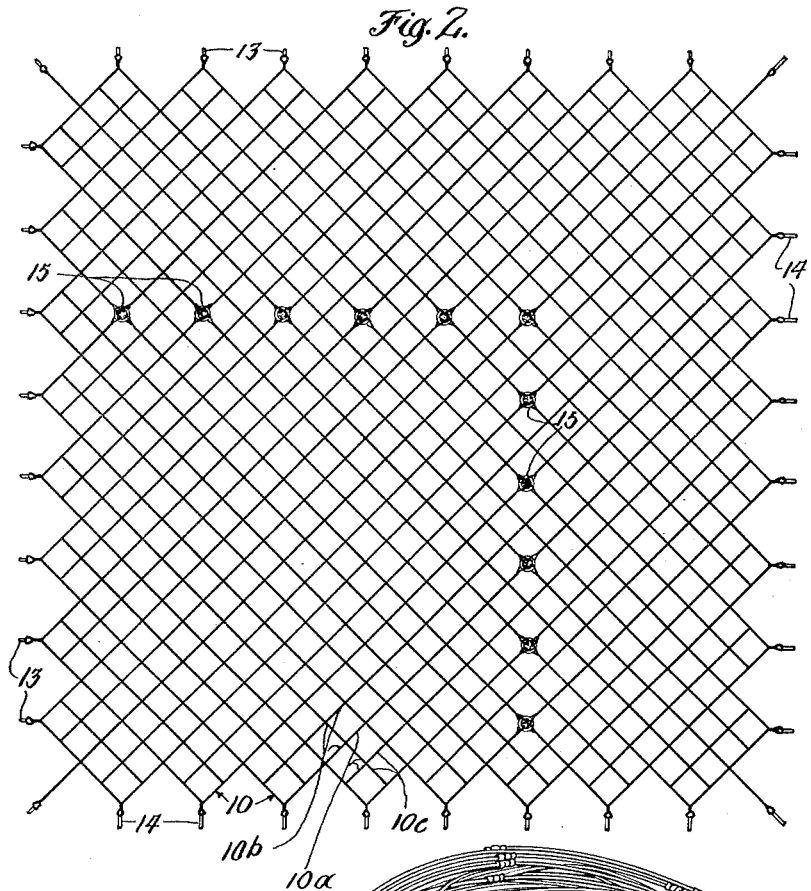
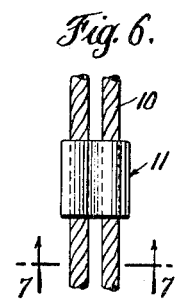
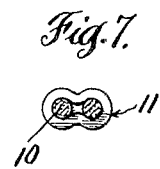
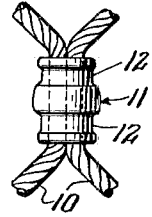
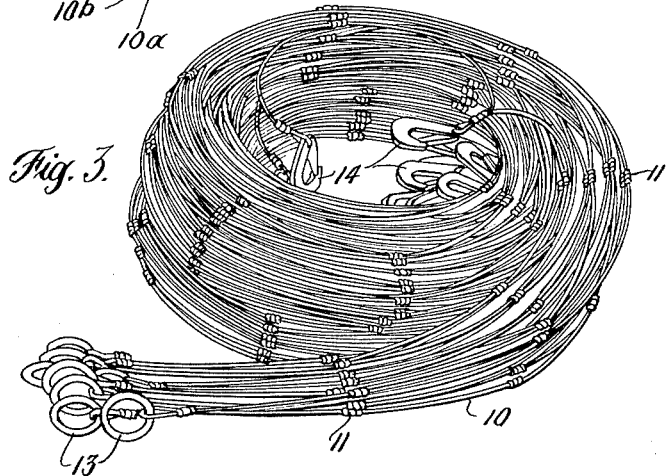
INVENTOR
Harris S. Campbell

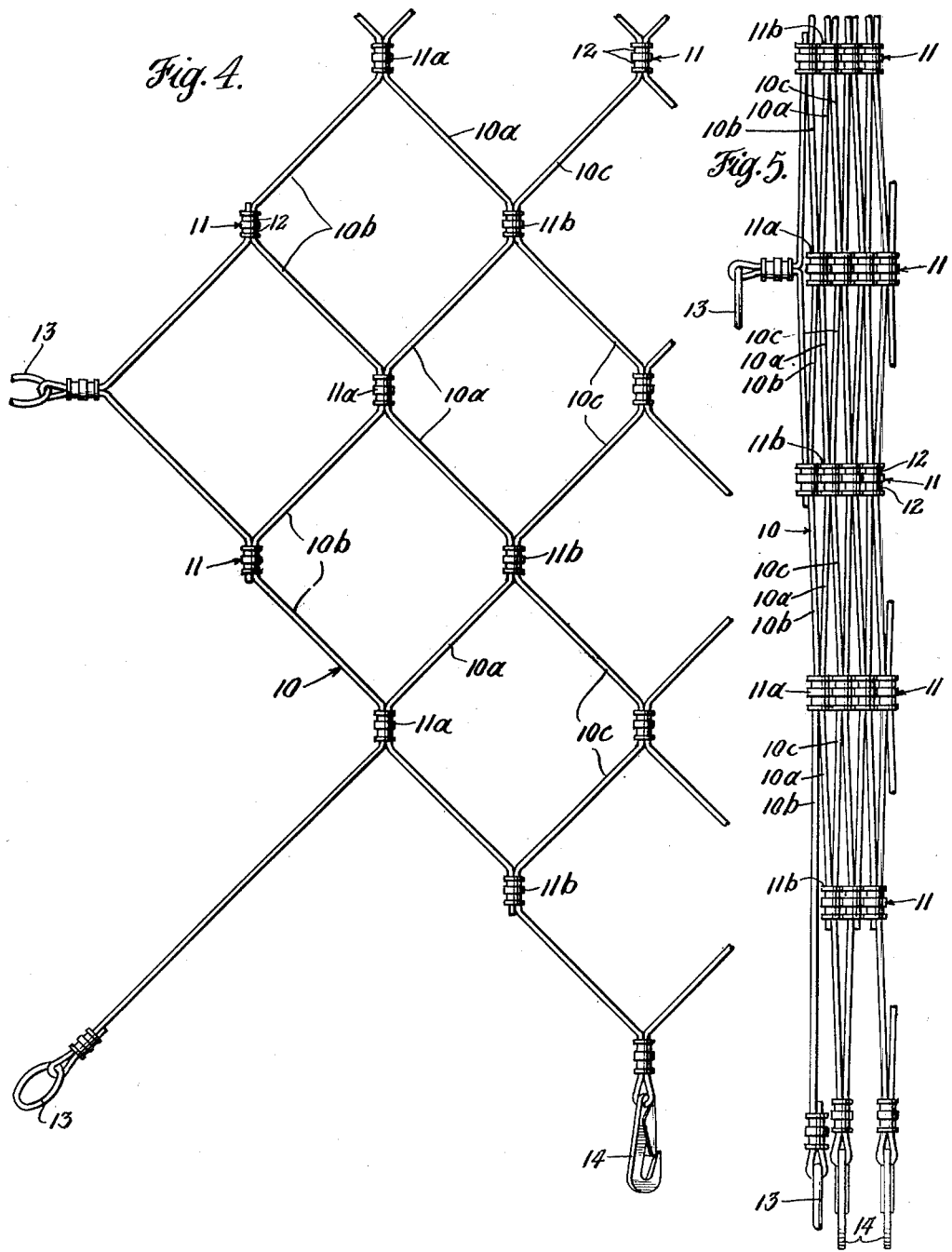

United States Patent Office 2,705,461
Patented Apr. 5, 1955

2,705,461

CARGO NET FABRICATED FROM FLEXIBLE CABLE

Harris S. Campbell, Bryn Athyn, Pa., assignor to Eastern Rotorcraft Corporation, Bucks County, Pa., a corporation of Pennsylvania Application June 19, 1951, Serial No. 232,271

4 Claims. (Cl. 105—369)

This invention relates to nets fabricated from flexible cable and is particularly concerned with nets suitable for holding or retaining in position a large number of pieces of miscellaneous cargo during transit.

In constructing nets for use in retaining or handling cargo, it is the normal practice to provide members which run longitudinally and transversely with respect to the edges of the net proper. Anchoring points or fittings are usually provided at the terminals of the net members and directly in line with them. Where the tension elements of the net cross each other they are fastened together in some suitable fashion to retain the net mesh in fixed form.

It is a primary object of the present invention to provide a construction for a cargo net having its cable members all lying in the same plane so that it is unnecessary for one cable to overlap another cable at any point.

Another object of the invention is to provide a cargo net in which the net members pull off diagonally from the anchor points in order to provide greater flexibility and resiliency in the retention action of the net.

A further object of the invention is to provide a net construction which may be readily folded for storage purposes, the arrangement of the present invention permitting all of the members of the net to lie parallel to each other. In this manner the net may be conveniently stored in a rack or rolled into a compact coil.

Still another object of the invention is the provision of a net construction which may be manufactured using standard cable fastening fittings and tools.

How the foregoing and other objects and advantages of the invention are accomplished will be clear from the following description of the drawings in which—

Figure 2 is a plan view of the general arrangement of a net according to the present invention shown in extended operating condition.

Figure 3 is a view illustrating the net in compacted coiled form for storage purposes.

Figure 4 is a view to enlarged scale of a portion of the net showing the details of construction and assembly.

Figure 5 is a detail to the same scale as Figure 4, showing the cable elements lying in parallel position.

Figure 6 is an enlarged view of one of the cable clamping fittings in position.

Figure 7 is a view looking in the direction of arrows 7—7, Figure 6.

Figure 8 is a view similar to Figure 6 but showing the fitting after the swaging operation has taken place.

Figure 1:
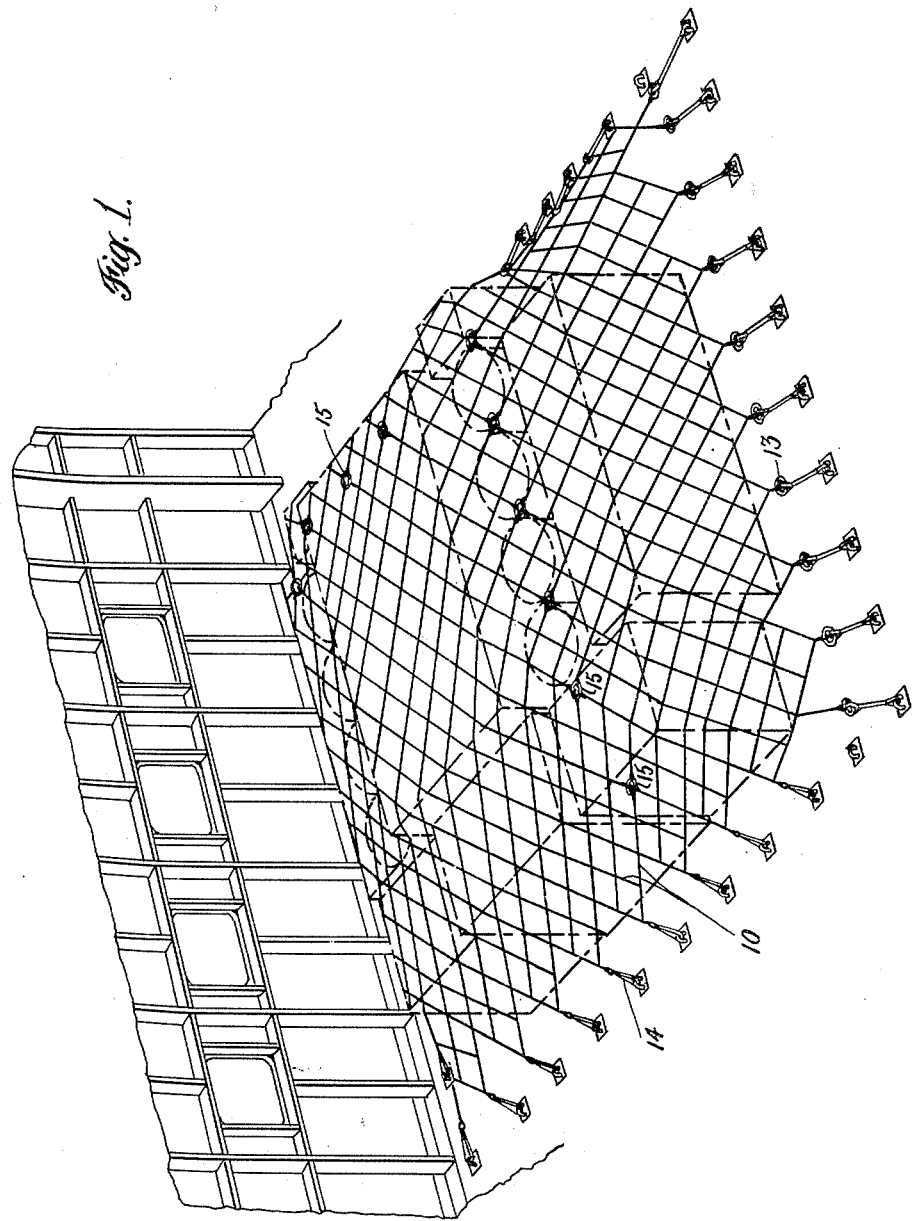
Figure 1 is a perspective view of a fuselage portion of a cargo aircraft showing a net retaining cargo in position.

From Figure 1 it will be seen that the cargo net of the present invention can be used conveniently to hold down various pieces of loose cargo which cannot otherwise be conveniently secured individually. The cargo net is fastened along one of its edges and passed over the pile of cargo being secured. The net is then drawn taut and the other edges are secured to additional lashing points either directly or by means of supplemental tie-down equipment, which may incorporate tensioning mechanism.

The construction of the cargo net of the present invention will be most clearly understood by reference to Figures 2 and 4. From these figures it will be evident that the individual cable members composing the cargo net are arranged in zig-zag fashion to form a diamond-shaped pattern in which each longitudinal cable, except the two side cables, is connected to the adjacent cable at one side of it at alternate points and to the adjacent cable at the other side of it at another set of alternate points. The longitudinal individual cable members are indicated by numeral 10. For illustrative purposes a single strand of cable 10a is selected. It will be seen, therefore, that cable 10a extends generally longitudinally and is attached to cable 10b at points 11a and is attached to cable 10c at points 11b.

Reference to Figure 4 will disclose the detail construction of the cable assembly more clearly. The various connection points are maintained by means of deformable metal fittings which are indicated by numeral 11. These fittings are of standard construction and are used because of their convenience and adaptability for the present type of net construction.

The swaged fittings for retaining the cables in attached relationship are shown more clearly in Figures 6, 7 and 8. In Figure 6, the fitting before final assembly is shown in place on a pair of cables which pass through fitting 11. The cross-sectional form of the fitting is clearly shown in Figure 7. By the use of a standard swaging tool which may be hand operated or power operated, the fitting 11 is crimped or swaged at multiple points as indicated at 12, Figure 8, so that it is forced into intimate engagement with the cable members passing through the fitting. After this operation, the fitting 11 is capable of transmitting substantially the full strength of the cable from one cable to the other.

At various locations along the edges of the net assembly, suitable connecting devices which may be in the form of rings 13 and hooks 14 are attached. In this way the net may be lashed down to fittings supplied in the carrier vehicle or aircraft to suitably retain the load of loose parts or packages which it may be retaining after the general fashion indicated in Figure 1.

For storage purposes the net may be stretched out along the general direction of the individual cable members 10 to form a group or bundle of parallel cables as illustrated in Figure 5. In this form the net may be stored upon hooks located along the wall of the vehicle, or as shown in Figure 3, the parallel cables may be rolled into a coil and compactly stored in any convenient spot in the vehicle.

In case the load being handled does not require the full area of the net for retaining it in position, a portion of the net may be used. In this case it is desirable to connect the lashing members to intermediate positions on the net. For this purpose rings 15 may be placed at various locations throughout the net so as to provide convenient connecting points for tie-down devices. In the event that a larger net area is needed, the hooks 14 along one edge of a net may be snapped into the rings 13 along the edge of another net to form an enlarged unit.

From the foregoing, it will be evident that I have provided an improved form of cargo net construction. The method of constructing this with parallel cables, each cable connected to alternate cables at alternate points so as to form a diamond-shaped grid pattern when extended, forms a simple method of construction and produces a net which is flexible in nature inasmuch as the attachment points are in diagonal relationship with the cable members rather than in individual direct tension relationship. In this way the net members have greater capacity for adapting themselves to irregular shapes and contours. This net construction further permits the storing of the net as a series of parallel cables merely by the extension of the two ends of the net. The use of standard cable and standard cable fitting connectors further simplifies the construction of the net and attachment of the rings or hooks for use for lashing purposes. Since none of the individual cable members of the net overlap any other cable member the danger of the net becoming tangled is eliminated.

I claim:

1. A net device constructed from flexible cable including a plurality of generally longitudinal runs of cable, each run extending in zig-zag fashion when the net mesh is in open position, each interior run being attached to the adjacent run on one side at spaced points by a swaged fitting at each point and being similarly attached to the adjacent run on the other side at alternately spaced points to form a series of parallelograms with their sides lying in diagonal relationship with respect to the longitudinal direction, said swaged fittings having their longitudinal axes lying in the longitudinal direction of the cable runs, a plurality of load attachment terminals located at the ends of inside cable runs, each of said terminals being connected to the ends of two runs of cable at the external corner of a peripheral parallelogram.

2. A net construction according to claim 1 wherein each load attachment terminal has a looped portion of cable formed by a swaged fitting.

3. A net device constructed from flexible cable including a plurality of generally longitudinal runs of cable, each run extending in zig-zag fashion when the net mesh is in open position, each interior run being attached to the adjacent run on one side at spaced points by a swaged fitting at each point and being similarly attached to the adjacent run on the other side at alternately spaced points to form a series of parallelograms with their sides lying in diagonal relationship with respect to the longitudinal direction of the net device, said swaged fittings having their longitudinal axes lying in the longitudinal direction of the cable runs, a plurality of load attachment terminals each located at the ends of two inside cable runs, each of said terminals being connected at the external corner of a peripheral parallelogram, the sides of the net also being provided with a plurality of load attachment terminals, each located at an external corner of a peripheral parallelogram.

4. A net device constructed from flexible cable including a plurality of generally longitudinal runs of cable, each run extending in zig-zag fashion when the net mesh is in open position, each interior run being attached to the adjacent run on one side at spaced points by a swaged fitting at each point and being similarly attached to the adjacent run on the other side at alternately spaced points to form a series of parallelograms with their sides lying in diagonal relationship with respect to the longitudinal direction of the net device, said swaged fittings having their longitudinal axes lying in the longitudinal direction of the cable runs, a plurality of load attachment terminals located along the side of the net, each located at an external corner of a peripheral parallelogram and each having a loop portion of cable formed by a swaged fitting whose longitudinal axis lies in a transverse direction with respect to the swaged fittings which form the corner points of the inside parallelogram.

References Cited in the file of this patent

UNITED STATES PATENTS

| | | |
|---|---|---|
| 254,630 | Farrar | Mar. 7, 1882 |
| 2,226,667 | Love | Dec. 31, 1940 |
| 2,490,434 | Harris | Dec. 6, 1949 |
| 2,559,240 | Wiggin | July 3, 1951 |

FOREIGN PATENTS

| | | |
|---|---|---|
| 32,401 | Netherlands | July 15, 1932 |